US007592786B2

(12) United States Patent
Xu et al.

(10) Patent No.: US 7,592,786 B2
(45) Date of Patent: Sep. 22, 2009

(54) AIRCRAFT ENGINE STARTER/GENERATOR

(75) Inventors: Mingzhou Xu, Oro Valley, AZ (US); Cristian E. Anghel, Oro Valley, AZ (US); Wayne T. Pearson, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 217 days.

(21) Appl. No.: 11/837,634

(22) Filed: Aug. 13, 2007

(65) Prior Publication Data

US 2009/0045784 A1 Feb. 19, 2009

(51) Int. Cl.
*H02P 9/10* (2006.01)
*H02P 9/14* (2006.01)
*F02N 11/04* (2006.01)
*H02K 23/52* (2006.01)
*H02P 9/04* (2006.01)

(52) U.S. Cl. .......................................... 322/59; 290/46

(58) Field of Classification Search .................. 322/59; 290/46; 310/68

See application file for complete search history.

(56) References Cited

U.S. PATENT DOCUMENTS

| | | | | |
|---|---|---|---|---|
| 4,219,739 | A * | 8/1980 | Greenwell | 290/46 |
| 4,486,801 | A * | 12/1984 | Jackovich et al. | 361/21 |
| 4,830,412 | A | 5/1989 | Raad et al. | 290/31 |
| 5,283,471 | A * | 2/1994 | Raad | 290/46 |
| 5,594,322 | A * | 1/1997 | Rozman et al. | 322/10 |
| 5,747,971 | A * | 5/1998 | Rozman et al. | 322/10 |
| 5,850,138 | A * | 12/1998 | Adams et al. | 322/68 |
| 6,486,640 | B2 * | 11/2002 | Adams | 322/59 |
| 6,628,104 | B2 * | 9/2003 | Yao et al. | 322/59 |
| 6,768,278 | B2 * | 7/2004 | Xu et al. | 318/140 |
| 6,844,707 | B1 | 1/2005 | Raad | 322/29 |
| 6,906,479 | B2 * | 6/2005 | Xu et al. | 318/140 |
| 6,909,263 | B2 * | 6/2005 | Xu et al. | 322/29 |
| 6,979,979 | B2 * | 12/2005 | Xu et al. | 322/59 |
| 7,045,986 | B2 * | 5/2006 | Anghel et al. | 318/712 |
| 7,122,994 | B2 * | 10/2006 | Anghel et al. | 322/60 |
| 7,388,300 | B2 * | 6/2008 | Anghel et al. | 290/39 |
| 7,400,056 | B2 * | 7/2008 | McGinley et al. | 290/46 |
| 7,514,806 | B2 * | 4/2009 | Xu et al. | 290/31 |
| 2002/0117999 | A1 * | 8/2002 | Yao et al. | 322/59 |
| 2004/0027077 | A1 * | 2/2004 | Xu et al. | 318/107 |
| 2004/0080300 | A1 * | 4/2004 | Xu et al. | 322/59 |
| 2005/0225303 | A1 * | 10/2005 | Xu et al. | 322/59 |
| 2006/0061336 | A1 * | 3/2006 | Anghel et al. | 322/59 |
| 2006/0087293 | A1 * | 4/2006 | Xu et al. | 322/59 |
| 2007/0108854 | A1 * | 5/2007 | Osborn et al. | 310/68 D |
| 2008/0067984 | A1 * | 3/2008 | Anghel et al. | 322/52 |
| 2008/0079262 | A1 * | 4/2008 | McGinley et al. | 290/31 |
| 2008/0303280 | A1 * | 12/2008 | Xu et al. | 290/31 |
| 2008/0303490 | A1 * | 12/2008 | Xu et al. | 322/29 |

* cited by examiner

*Primary Examiner*—Nicholas Ponomarenko
*Assistant Examiner*—Pedro J Cuevas
(74) *Attorney, Agent, or Firm*—Oral Caglar, Esq.

(57) ABSTRACT

A rotor resistor and switch combination may cause a starter/generator device to function as an asynchronous device when in a start mode. Thus, starting torque may result. A starter/generator device may include an exciter rotor winding, a main rotor winding, and a resistor and switch combination positioned between the exciter rotor winding and the main rotor winding to control a flow of current in the main rotor winding during a start mode of the starter/generator device. A method of optimizing starting torque of a starter/generator device without a start controller unit during a start mode may include providing a main rotor winding of the starter/generator device, and providing a control to control a flow of current in the main rotor winding during the start mode.

15 Claims, 3 Drawing Sheets

AIRCRAFT ENGINE STARTER/GENERATOR

BACKGROUND OF THE INVENTION

The present invention relates generally to engine starters and generators and, more particularly, to combined engine starter/generators.

In the aerospace industry, electric engine start technology has become a de facto standard for engine starters and generators. According to an aspect of this technology, a starter and a generator may be combined in a single starter/generator device. Such a design may be advantageous in terms of weight and size.

A starter/generator device may include three generators: a permanent magnet generator, an exciter generator, and a main generator. Each generator may include a stator and a rotor. Each rotor may include a winding.

A starter/generator device may be a synchronous, brushless electric device. A starter/generator device may be said to be synchronous when the frequency of the starter/generator device is proportional to an input speed when the starter/generator device is in a generate mode. A starter/generator device may be said to be brushless when, instead of using brushes to transfer current to main rotor, an exciter may be used to provide excitation current to the main field when the starter/generator device is in a generate mode.

In order to effectively start an engine, torque is necessary. When a conventional starter/generator device is placed in a start mode, a start controller unit may be used to provide electrical power to create torque of the starter/generator device. The start controller unit may add significant weight and volume to a starting system. Depending on the application, the start controller unit can range, for example, from 50% to more than 100% of the weight of the generator itself. Additionally, the starter/generator device may be located at a distance from the start controller unit requiring unwanted additional wiring.

As can be seen, there is a need for an aircraft engine starter/generator device not requiring a start controller unit.

SUMMARY OF THE INVENTION

In one aspect of the present invention, a starter/generator device may include an exciter stator, a main stator, and a rotor portion. The rotor portion may include an exciter rotor winding, a main rotor winding, and a resistor and switch combination positioned between the exciter rotor winding and the main rotor winding to control a flow of current in the main rotor winding during a start mode of the starter/generator.

In another aspect of the present invention, a rotor portion of a starter/generator device may include an exciter rotor winding, a main rotor winding, and a device forming an isolated closed circuit with the main rotor winding during a start mode.

In another aspect of the present invention, a method of optimizing starting torque of a starter/generator device without a start controller unit during a start mode may include providing a main rotor winding of the starter/generator device, and providing a control to control the flow of current in the main rotor winding of the starter/generator device during the start mode.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, embodiments of the present invention may relate to a starter/generator device including a switch and resistor to form a closed circuit with the main rotor winding during a start mode. Embodiments may be useful in a variety of applications, such as aircraft or other vehicles using starter/generators. A switch and a resistor may cause the starter/generator device to function as an asynchronous device when in start mode. Thus, starting torque may result.

Embodiments of the present invention may differ from conventional starter/generators at least by not requiring a start controller unit. Embodiments of the present invention may differ from conventional starter/generators at least by adding a switch and resistor. Embodiments of the present invention may differ from conventional starter/generators at least by causing a starter/generator to function as an asynchronous device when in start mode.

Figure 1:
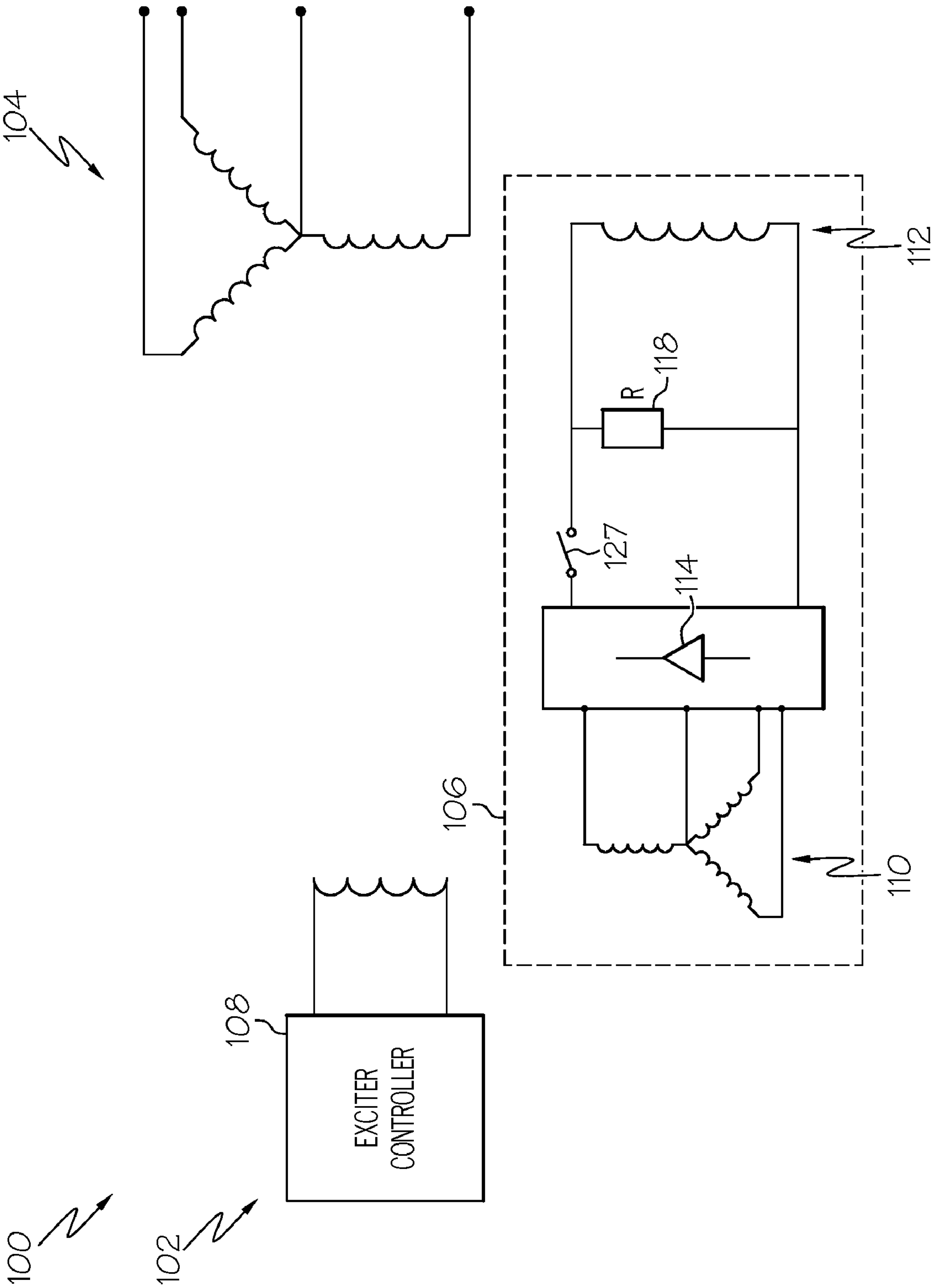
FIG. 1 is a schematic representation of a starter/generator device according to an embodiment of the present invention.

FIG. 1 is a schematic representation of a starter/generator device 100 according to an embodiment of the present invention. The starter/generator device 100 may include an exciter stator 102, a main stator 104, and a rotor portion 106. The exciter stator 102 may include an exciter controller 108. The rotor portion 106 may include an exciter rotor winding 110, a main rotor winding 112, a diode rectifier assembly 114, a resistor 118, and a switch 127.

The starter/generator device 100 may operate in a generate mode and a start mode. In generate mode, the exciter controller 108 may excite the exciter stator 102. A magnetic field may be coupled into the exciter rotor winding 110. The exciter rotor winding 110 may output a voltage which may be rectified by the diode rectifier assembly 114 and passed through the switch 127, which may be closed. In an embodiment, the exciter rotor winding may be poly-phase windings.

The voltage that may be rectified by the diode rectifier assembly 114 may be supplied to the main rotor winding 112. This voltage may establish a direct current ("DC") which in turn may establish a DC magnetic field flux which may be rotating at the shaft speed and may be coupled in the main stator 104. This may induce in the main stator 104 the main voltages that may be used by a vehicle such as an aircraft.

With respect to the start mode of the starter/generator device 100, the rotor portion 106 may include the switch 127 and the resistor 118. The switch 127 and the resistor 118 may be positioned between the exciter rotor winding 110 and the main rotor winding 112. In an embodiment, the switch 127 and the resistor 118 may be positioned between the diode rectifier assembly 114 and the main rotor winding 112.

When in a start mode, power may be supplied from a vehicle auxiliary power unit (APU) or ground power supply.

The switch 127 and the resistor 118 may form an isolated closed circuit with the main rotor winding 112 with the switch 127 open when the starter/generator device 100 is in the start mode. The starter/generator device 100, which may be a synchronous device when in the generate mode, may function as an asynchronous device when in the start mode due to the switch 127 and the resistor 118. That is, the starter/generator 100 may act as an asynchronous induction motor during the start mode. Conceptually, the switch 127 and the resistor 118 may cause the main rotor winding 112 to function similar to bars of a squirrel cage of an induction machine. Thus, starting torque may result.

The resistor 118 may form an isolated closed circuit with the main rotor winding 112 and the switch 127 may prevent current from flowing into the exciter rotor winding 110. In an embodiment, the resistor 118 may be a damper resistor. The optimum resistor value that produces maximum torque may be dependent upon machine parameters. The design of the damper bars included in the starter/generator device may also have an impact on the starting torque.

Figure 2:
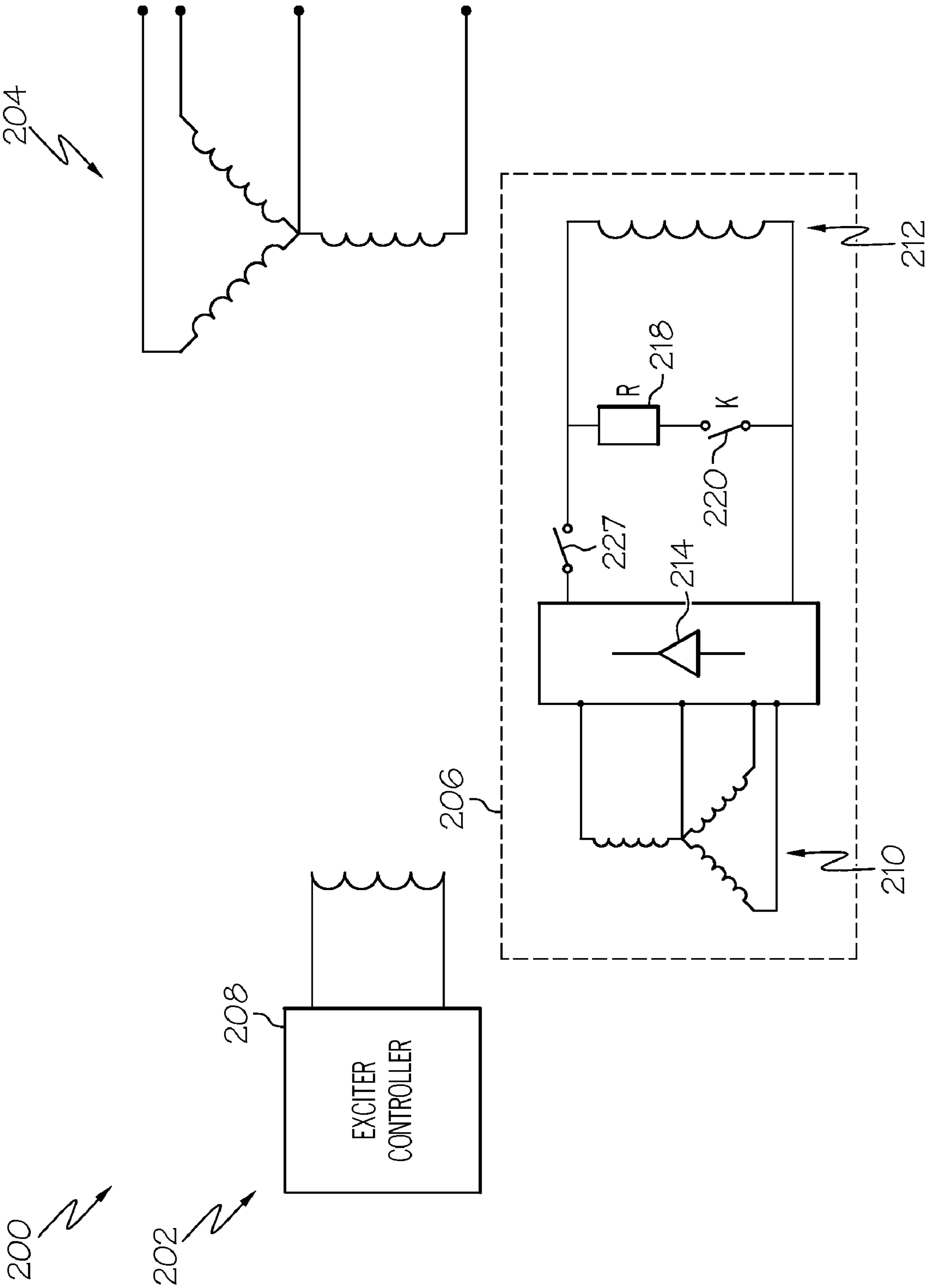
FIG. 2 is a schematic representation of a starter/generator device according to an embodiment of the present invention.

FIG. 2 is a schematic representation of a starter/generator device 200 according to an embodiment of the present invention. The starter/generator device 200 may include an exciter stator 202, a main stator 204, and a rotor portion 206. The exciter stator 202 may include an exciter controller 208. The rotor portion 206 may include an exciter rotor winding 210, a main rotor winding 212, a diode rectifier assembly 214, a resistor switch 220, a resistor 218, and an isolating switch 227. In the description of the embodiment of FIG. 2, redundant discussions of aspects of features similar to those already discussed are omitted for clarity.

The resistor 218; resistor switch 220, and the isolating switch 227 may form an isolated closed circuit with the main rotor winding 212 when the starter/generator device 200 is in a start mode. The resistor switch 220 may connect the resistor 218 when the starter/generator device 200 is in the start mode and disconnect the resistor 218 when the starter/generator device 200 is in a generate mode. The isolating switch 227 may disconnect the main rotor winding 212 from the exciter rotor winding 210 during the start mode, and connect the main rotor winding 212 and the exciter rotor winding 210 in the generate mode.

The resistor switch 220 may be controlled using a voltage signal from the main rotor winding 212. The isolating switch 227 may be controlled using a voltage signal from the exciter rotor winding 210. Alternatively the switches 220 and 227 may be controlled by centrifugal forces which may be proportional to the rotor speed. In an alternative embodiment, the resistor switch 220 may be eliminated by using an eddy current mechanism to vary the value of the resistor 218.

Figure 3:
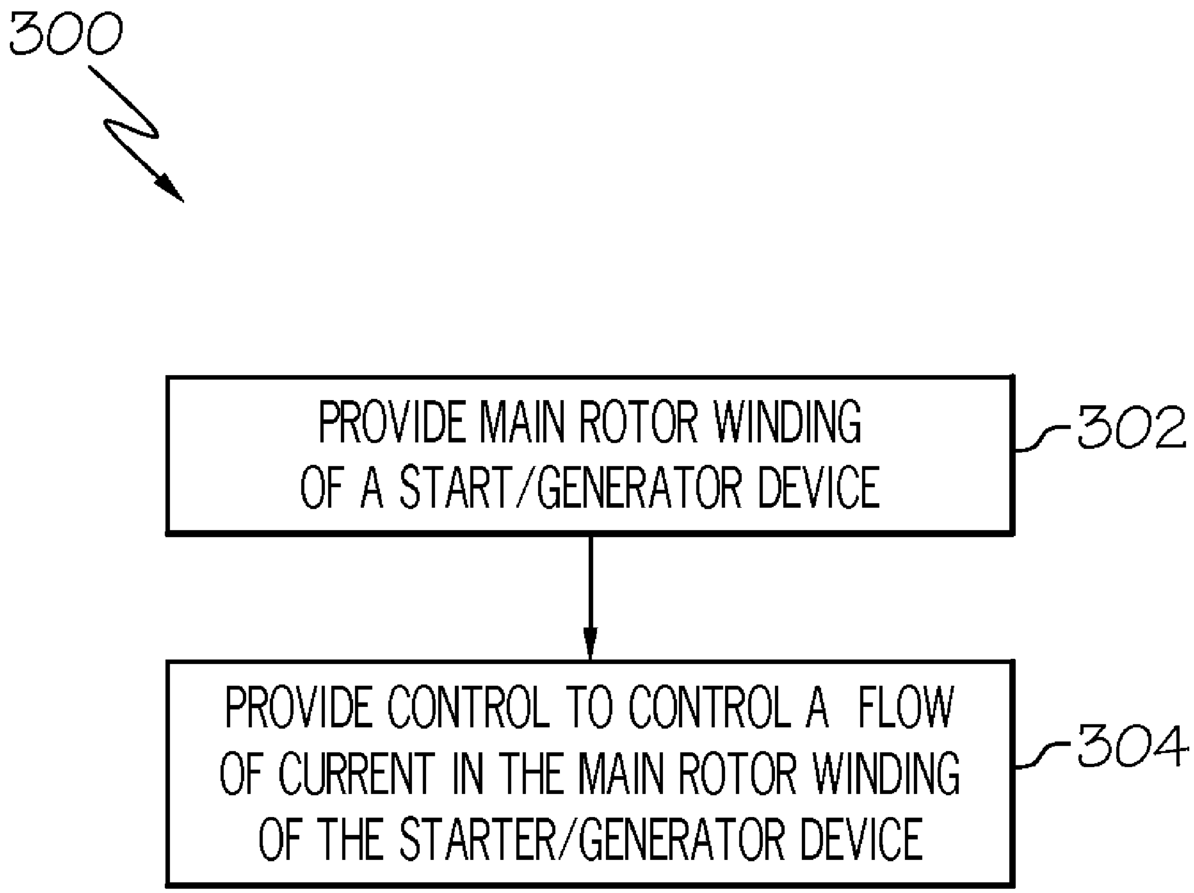
FIG. 3 is a flowchart of a method of optimizing starting torque of a starter/generator device without a start controller unit according to an embodiment of the present invention.

FIG. 3 is a flowchart of a method 300 of optimizing starting torque of a starter/generator device without a start controller unit according to an embodiment of the present invention. The method 300 may include providing 302 a main rotor winding of a starter/generator device. The method may include providing 304 a control to control the flow of current in the main rotor winding of the starter generator device during a start mode.

It should be understood, of course, that the foregoing relates to exemplary embodiments of the invention and that modifications may be made without departing from the spirit and scope of the invention as set forth in the following claims.

We claim:

1. A starter/generator device, comprising:
an exciter stator;
a main stator; and
a rotor portion, the rotor portion comprising:
an exciter rotor winding;
a main rotor winding; and
a resistor and switch combination positioned between the exciter rotor winding and the main rotor winding to control a flow of current in the main rotor winding during a start mode of the starter/generator.

2. The starter/generator device of claim 1, further comprising a diode rectifier assembly positioned between the exciter rotor winding and the main rotor winding.

3. The starter/generator device of claim 1, wherein the resistor and switch combination comprises a single switch.

4. The starter/generator device of claim 1, wherein the resistor and switch combination comprises a resistor switch and an isolating switch.

5. The starter/generator device of claim 1, wherein the resistor and switch combination comprises an eddy current mechanism to vary a value of the resistor.

6. The starter/generator device of claim 1, wherein the resistor and switch combination forms an isolated closed circuit with the main rotor winding during the start mode to cause the starter/generator device to function in an asynchronous manner.

7. The starter/generator device of claim 4, wherein the resistor switch is controlled by a voltage signal from the main rotor winding.

8. The starter/generator device of claim 4, wherein the isolating switch is controlled by a voltage signal from the excitor rotor winding.

9. The starter/generator device of claim 4, wherein at least one of the resistor switch and the isolating switch is controlled by centrifugal forces.

10. A rotor portion of a starter/generator device, comprising:
an exciter rotor winding;
a main rotor winding; and
a device forming an isolated closed circuit with the main rotor winding during a start mode.

11. The rotor portion of the starter/generator device of claim 10, wherein the device forming an isolated closed circuit with the main rotor winding during a start mode forms an isolated closed circuit with the main rotor winding during the start mode to cause the starter/generator device to function in an asynchronous manner.

12. The rotor portion of the starter/generator device of claim 10, wherein the device forming an isolated closed circuit with the main rotor winding during the start mode comprises a resistor and a switch.

13. The rotor portion of the starter/generator device of claim 10, wherein the device forming an isolated closed circuit with the main rotor winding during the start mode comprises a resistor and an eddy current mechanism.

14. A method of optimizing starting torque of a starter/generator device without a start controller unit during a start mode, the method comprising:
providing a main rotor winding of the starter/generator device; and
providing a control to control the flow of current in the main rotor winding of the starter/generator device during the start mode.

15. The method of claim 14, wherein the providing of the control to control the flow of the current in the main rotor winding of the starter/generator device during the start mode comprises providing a control to cause the starter/generator device to function in an asynchronous manner.

* * * * *